(12) United States Patent
Tokimasa (10) Patent No.: US 10,473,186 B2
(45) Date of Patent: Nov. 12, 2019

(54) COUPLING STRUCTURE

(71) Applicant: HI-LEX CORPORATION, Takarazuka-shi (JP)

(72) Inventor: Hidenori Tokimasa, Takarazuka (JP)

(73) Assignee: HI-LEX CORPORATION, Takarazuka-shi (JP)

( * ) Notice: Subject to any disclaimer, the term of this patent is extended or adjusted under 35 U.S.C. 154(b) by 0 days.

(21) Appl. No.: 15/766,963

(22) PCT Filed: Oct. 12, 2016

(86) PCT No.: PCT/JP2016/080280
§ 371 (c)(1),
(2) Date: Apr. 9, 2018

(87) PCT Pub. No.: WO2017/065185
PCT Pub. Date: Apr. 20, 2017

(65) Prior Publication Data
US 2018/0298984 A1    Oct. 18, 2018

(30) Foreign Application Priority Data
Oct. 12, 2015  (JP) .................................. 2015-201651

(51) Int. Cl.
*F16C 1/26*    (2006.01)
*F16C 1/10*    (2006.01)
(Continued)

(52) U.S. Cl.
CPC ................ *F16G 11/08* (2013.01); *F16C 1/08* (2013.01); *F16C 1/10* (2013.01); *F16C 1/101* (2013.01);
(Continued)

(58) Field of Classification Search
CPC .. F16G 11/08; F16G 11/09; F16C 1/08; F16C 1/10; F16C 1/101; F16C 1/102;
(Continued)

(56) References Cited

U.S. PATENT DOCUMENTS 3,211,485 A * 10/1965 Petersen .................. F16C 1/08
285/319
3,276,799 A    10/1966 Moore
(Continued)

FOREIGN PATENT DOCUMENTS

DE    719512 C  *  4/1942    .............. F16C 1/101
DE    929652 C  *  6/1955    ............ B62M 25/04
(Continued)

OTHER PUBLICATIONS

International Search Report for International Application No. PCT/JP2016/080280 dated Dec. 27, 2016 (2 Sheets).
(Continued)

*Primary Examiner* — Adam D Rogers
(74) *Attorney, Agent, or Firm* — Kratz, Quintos & Hanson, LLP (57) ABSTRACT

The present invention aims to provide a coupling structure which facilitates work of coupling an end portion of a cable to an object to be coupled. The present invention relates to a coupling structure that couples one end of a first cable and another member. The coupling structure includes a coupling portion that couples the one end of the first cable and the other member, and a protection member that slidably houses the coupling portion. The protection member has a first opening portion which is provided at one end portion of the protection member and through which the first cable is inserted such that the first cable and the protection member are relatively movable, and a second opening portion provided at the other end portion of the protection member and
(Continued)

from which the first cable is extendable. The coupling portion has an inclined surface that is inclined from the other member side toward the first cable side so as to abut on the second opening portion and guide the coupling portion inside the protection member in a state where the coupling portion is positioned on a radially outer side of the second opening portion when the coupling portion is relatively moved with respect to and housed into the protection member. Thus, the present invention has good coupling workability.

3 Claims, 6 Drawing Sheets

(51) Int. Cl.
*F16G 11/08* (2006.01)
*F16C 1/08* (2006.01)
*F16C 1/14* (2006.01)
*F16C 1/16* (2006.01)

(52) U.S. Cl.
CPC ................ *F16C 1/145* (2013.01); *F16C 1/16* (2013.01); *F16C 2226/70* (2013.01); *F16C 2300/02* (2013.01)

(58) Field of Classification Search
CPC .. F16C 1/106; F16C 1/107; F16C 1/14; F16C 1/16; F16C 1/26
See application file for complete search history.

(56) References Cited

U.S. PATENT DOCUMENTS

| | | | |
|---|---|---|---|
| 5,149,302 A * | 9/1992 | Yano | F16C 1/08 464/177 |
| 6,056,020 A | 5/2000 | Malone | |
| 6,324,938 B1 * | 12/2001 | Okouchi | B62M 25/02 403/309 |
| 9,340,097 B2 * | 5/2016 | Van Boxtel | B60J 7/057 |
| 2008/0178703 A1 | 7/2008 | Anderson | |
| 2018/0119723 A1 * | 5/2018 | Naoi | F16C 1/10 |

FOREIGN PATENT DOCUMENTS

| | | | | |
|---|---|---|---|---|
| EP | 0369411 A1 | | 5/1990 | |
| EP | 1903225 A2 | | 3/2008 | |
| FR | 2712536 A1 | * | 5/1995 | ......... B60H 1/00857 |
| JP | H05-032820 U | | 4/1993 | |
| JP | H11-141530 A | | 5/1999 | |
| JP | 2009-228841 A | | 10/2009 | |
| JP | 2014009708 A | * | 1/2014 | .............. F16C 1/101 |

OTHER PUBLICATIONS

Supplementary European Search Report for European Patent Application No. 168555438.4 dated May 13, 2019 (9 pages).

* cited by examiner

COUPLING STRUCTURE

TECHNICAL Field

The present invention relates to a cable coupling structure.

BACKGROUND ART

A control cable coupling structure for connecting control cables to each other has been known. For example, Patent Literature 1 discloses a control cable coupling structure in which a coupling means is configured of a locking piece and an engaging portion. The locking piece is provided at an end of an inner cable which is included in one control cable. The engaging portion is provided at the other end of an inner cable which is included in the other control cable. The coupling means is housed inside a protection member formed of a fixed protection tube and a movable protection tube, and is configured to slide inside the protection member.

In Patent Literature 1, the locking piece can be easily exposed from the movable protection tube, and thus, it is regarded that coupling of the coupling means can be easily performed.

CITATION LIST

Patent Literature

Patent Literature 1: JP 2009-228841 A

SUMMARY OF INVENTION

Technical Problem

In the coupling structure described in Patent Literature 1, a holding flange of the movable protection tube is moved by a biasing force of a compression coil spring until coming into close contact with a grommet mounted to the fixed protection tube after coupling the locking piece and the engaging portion, thereby forming the protection member.

At this time, there is a case where the coupling means overhangs in the radial direction of the protection member due to a tensile force of the inner cable or the like, or a length of the coupling means in the radial direction increases due to insufficient coupling of the locking piece and the engaging portion. In such a case, since the coupling means is interposed between the holding flange and the grommet, it is necessary to perform work of removing the interposed coupling means with a human hand or coupling the locking piece and the engaging portion again.

The present invention aims to provide a coupling structure that facilitates work of coupling an end portion of a cable to an object to be coupled.

Solution to Problem

A coupling structure according to the present invention is a coupling structure that couples one end of a first cable and another member. The coupling structure includes a coupling portion that couples the one end of the first cable and the other member, and a protection member that slidably houses the coupling portion. The protection member has a first opening portion provided at one end portion of the protection member and a second opening portion provided at the other end portion of the protection member and from which the first cable is extendable. The first opening portion is a portion which the first cable is inserted through such that the first cable and the protection member are relatively movable. The coupling portion has an inclined surface that is inclined from the other member side toward the first cable side so as to abut on the second opening portion and guide the coupling portion inside the protection member in a state where the coupling portion is positioned on a radially outer side of the second opening portion when the coupling portion is relatively moved with respect to and housed into the protection member.

Advantageous Effects of Invention

According to the coupling structure of the present invention, the workability at the time of coupling the end portion of the cable to the object to be coupled is good.

BRIEF DESCRIPTION OF DRAWINGS

In FIG. 2, (a) is a cross-sectional view of the coupling structure according to the first embodiment cut from the upper side to the lower side along the axial direction, (b) is a cross-sectional view cut from the front side to the back side along the axial direction of (a), and (c) is a cross-sectional view taken along a line A-A of (b).

In FIG. 4, (a) is an explanatory view illustrating a state in the middle of coupling using the coupling structure according to the first embodiment, and (b) is an explanatory view after coupling using the coupling structure of (a).

In FIG. 5, (a) to (e) are explanatory views illustrating a state of coupling using the coupling structure according to the first embodiment in a time series manner.

In FIG. 6, (a) is a cross-sectional view of a coupling structure according to a second embodiment, and (b) is a cross-sectional view of a modified example of the coupling structure according to the second embodiment.

In FIG. 8, (a) is a cross-sectional view of a coupling portion of a coupling structure according to a fourth embodiment, and (b) is a cross-sectional view illustrating a state of coupling using the coupling portion of (a).

DESCRIPTION OF EMBODIMENTS

<First Embodiment>

Figure 1:
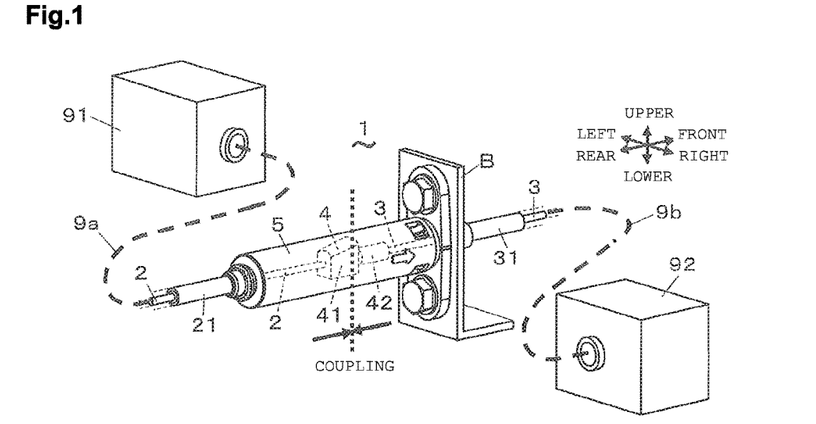
FIG. 1 is a perspective view illustrating a state where a coupling structure according to a first embodiment is applied.

A coupling structure according to an embodiment of the present invention will be described with reference to the drawings. Although reference is made to the spatial arrangement such as upper, lower, left, and right illustrated in the drawing in the description, the coupling structure of present embodiment can be used regardless of a mounting posture in the real space. First, an overview of a coupling structure 1 of the present embodiment will be described. For example, the coupling structure 1 according to the first embodiment couples a control cable 9*a* connected to an operating portion 91 and a control cable 9*b* connected to an operated portion 92 as illustrated in FIG. 1. The control cable 9*a* is configured of a first inner cable 2 which is a first cable and an outer casing 21. Similarly, the control cable 9*b* is configured of a second inner cable 3 which is a second cable and an outer casing 31. The coupling structure 1 includes a coupling portion 4 and a protection member 5 that slidably houses the coupling portion 4. The coupling portion 4 connects one end of the first inner cable 2 and one end of the second inner cable 3 which is a member different from the first inner cable 2.

The coupling portion 4 is configured of an engaging portion 41 and an engaged portion 42 and these are respectively connected to one ends of the control cables 9*a* and 9*b*, and thus, a coupling state where the first inner cable 2 and the second inner cable 3 are coupled with each other is formed by engaging the engaging portion 41 and the engaged portion 42. One end of the first inner cable 2 is connected to the engaging portion 41 and the other end is directly or indirectly connected to the operating portion 91. One end of the second inner cable 3 is connected to the engaged portion 42 and the other end is directly or indirectly connected to the operated portion 92. The coupling structure 1 transmits movement of the first inner cable 2 which moves in the front-rear direction in the drawing as movement of the second inner cable 3 in the front-rear direction in the drawing, by the operation of the operating portion 91. With this transmission, it is possible to transmit an operating force applied to the operating portion 91 to the operated portion 92. Thus, for example, the coupling structure 1 is formed such that the first inner cable 2 and the second inner cable 3 are routed in a state where a tensile force is applied. In this case, the coupling portion 4 can be formed by engaging the engaging portion 41 with the engaged portion 42 in a state where the tensile force is applied to the first inner cable 2 and the second inner cable 3.

Figure 2:
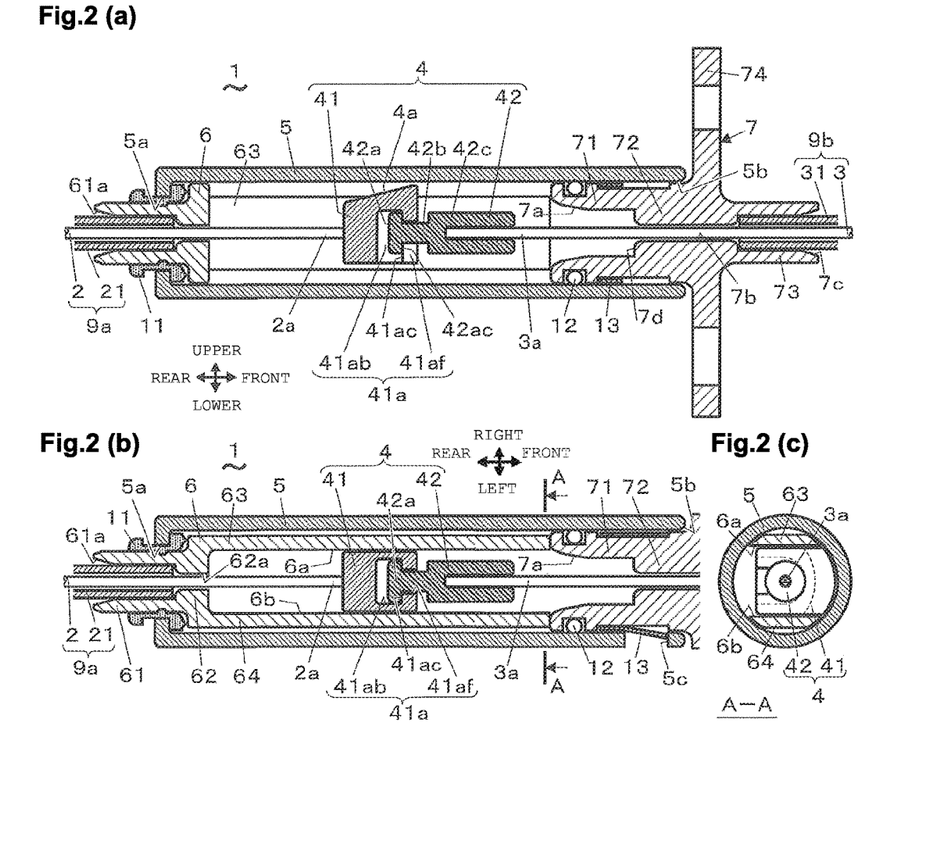

Next, a configuration of the coupling structure 1 will be described in more detail with reference to FIG. 2. The coupling structure 1 includes not only the coupling portion 4 and the protection member 5 but also an auxiliary member 6 that is provided inside the protection member 5 and guides the coupling portion 4, a fixing member 7 that fixes the coupling structure 1 to a mounting bracket B (see FIG. 1), packings 11 and 12 for sealing that confine the coupling portion 4 in the protection member 5, and an engagement spring member 13 that fixes the protection member 5 to the fixing member 7.

The coupling portion 4 has the engaging portion 41 fixed to an end portion 2*a* which is one end of the first inner cable 2 and the engaged portion 42 fixed to an end portion 3*a* which is one end of the second inner cable 3. The engaging portion 41 and the engaged portion 42 are engaged with each other to form the coupling portion 4 as described below. The first inner cable 2 and the second inner cable 3 are coupled by the coupling portion 4.

In the present embodiment, the engaging portion 41 has a rectangular parallelepiped shape having an inclined surface 4*a* on its upper surface. The engaging portion 41 has a concave portion 41*a* to house a protruding portion that protrudes in a vertical direction to a shaft-shaped portion of the engaged portion. The engaging portion 41 is fixed to the end portion 2*a* of the first inner cable 2, for example, by cast molding of metal. The engaging portion 41 may be fixed to one end of the first inner cable 2 by fixing the previously-molded engaging portion 41 by swaging or using an adhesive or the like. The concave portion 41*a* has a rear concave portion 41*ab* and a front concave portion 41*af* which are opened to a lower surface side. The front concave portion 41*af* has a lower surface opening opened to the lower surface side and a leading end opening opened to a leading end side of the first inner cable 2. The front concave portion 41*af* is positioned on the leading end side of the rear concave portion 41*ab* and communicates with the rear concave portion 41*ab* in the front-rear direction. A length of the rear concave portion 41*ab* from the lower surface side to the upper surface side (hereinafter referred to as a depth, and this is similarly applied for the front concave portion) is formed to be deeper than a depth of the front concave portion. Thus, an engaging-portion-side abutment surface 41*ac* is formed on the front side of the rear concave portion 41*ab*.

The engaged portion 42 has a shape in which a head portion 42*a*, a neck portion 42*b*, and a body portion 42*c*, having circular cylindrical shape respectively, are connected to each other. Here, the respective portions 42*a* to 42*c* are arranged on the same axis. The head portion 42*a* is a portion to be inserted into the concave portion 41*a* of the engaging portion 41, and is housed in the rear concave portion 41*ab*. The head portion 42*a* has a protruding portion that protrudes in a direction perpendicular to the axis of the neck portion 42*b* and has an abutment surface which abuts on the rear concave portion 41*ab*. The neck portion 42*b* is a portion having an outer diameter smaller than an outer diameter of the head portion 42*a*, which is an engagement piece, and connects the head portion 42*a* and the body portion 42*c*. A portion of the neck portion 42*b* on the rear side (an extension side from the second inner cable 3) is housed in the front concave portion 41*af*. When a diameter of the head portion 42*a* is larger than a diameter of the neck portion 42*b*, an engaged-portion-side abutment surface 42*ac* is formed on the second inner cable 3 side of the head portion 42*a*. The body portion 42*c* is a portion having substantially the same diameter as the outer diameter of the head portion 42*a* and is a portion to which the second inner cable 3 is fixed. In the present embodiment, the body portion 42*c* has an insertion hole coaxial to the central axis, and is fixed to the end portion 3*a* of the second inner cable 3, which has been inserted in the insertion hole, by swaging. When the head portion 42*a* and a part of the neck portion 42*b* are housed in the concave portion 41*a*, the engaging portion 41 and the engaged portion 42 are engaged with each other, and the coupling portion 4 is formed (details will be described later). The fixing of one end of the second inner cable 3 to the engaged portion 42 may be performed by fixing the previously-molded engaged portion 42 with an adhesive or the like or by performing both the formation and fixing using cast molding similarly to the engaging portion 41.

In the present embodiment, the protection member 5 is a tubular member that houses the coupling portion 4, and provided with a first opening portion 5a and a second opening portion 5b. The first opening portion 5a is provided at one end portion (rear end side) of the protection member 5, and the first inner cable 2 is inserted through the first opening portion 5a such that the first inner cable 2 and the protection member 5 can move relative to each other. The second opening portion 5b is provided at the other end portion (front end side) of the protection member 5, and the first inner cable 2 can extend from the second opening portion 5b. The first opening portion 5a has a size that does not allow the coupling portion 4 to pass therethrough, and a size of the second opening portion 5b is a size that allows the coupling portion 4 to pass therethrough, so that the coupling portion 4 can be housed in the protection member 5 from the outside.

After the control cables 9a and 9b are coupled by the coupling portion 4, the protection member 5 houses and protects the coupling portion 4. The coupling portion 4 moves in a direction along the axis (the front-rear direction) inside an internal space of the protection member 5 with the operation of the operating portion. The internal space in which the coupling portion 4 is housed is closed by fitting a fitting portion to the second opening portion 5b. The insertion hole 7b having a diameter which the second inner cable 3 is inserted through and the engaged portion 42 cannot pass through is provided in the fitting portion. The fitting portion loosely fitted to the second inner cable 3 in a state where the fitting portion is unremovable in the engaged portion 42 side. As a result of this closing, the coupling portion 4 is confined in the protection member 5 and protected from the outside. The fitting portion has an adapting portion fitted to the second opening portion 5b and a fitting-member-side engaging portion engaged with the second opening portion 5b. The fitting portion is configured of an inner tubular member 71, a body member 72, and an engagement spring member 13 in this embodiment so as to be fitted to the second opening portion 5b of the protection member 5. The protection member 5 is fixed to the fixing member 7 by the engagement spring member 13. The protection member 5 has an engagement opening 5c at a position that does not communicate with the closed internal space. A spring piece of the engagement spring member 13 enters and is engaged with the engagement opening 5c, and thus, the protection member 5 is restricted from relatively moving in the front-rear direction from the fixing member 7, and the protection member 5 is fixed to the fixing member 7.

The auxiliary member 6 has a first sliding portion 63 and a second sliding portion 64, which are provided side by side at a predetermined interval, and the first sliding portion 63 and the second sliding portion are coupled by a coupling portion. In the present embodiment, the coupling portion is configured of a tubular member 61 and a disk-shaped member 62 having an outer diameter larger than an outer diameter of the tubular member 61, and the first sliding portion 63 and the second sliding portion 64 are two long plate-shaped members. The coupling portion that couples the first sliding portion 63 and the second sliding portion 64 has an insertion hole 62a through which the first inner cable 2 is inserted. The engaging portion 41 is movable between the first sliding portion 63 and the second sliding portion 64 as the first inner cable 2 is inserted through the insertion hole 62a. The tubular member 61 forms a rear-side portion of the auxiliary member 6 and is fixed to one end side of the outer casing 21 that has been inserted from the opening portion 61a, for example, by swaging. The front side of the tubular member 61 is housed inside the protection member 5, and the rear side thereof is exposed to the outer circumference.

The packing 11 is arranged between an outer circumferential surface of the tubular member 61 and a side edge of the first opening portion 5a. The first opening portion 5a side of the protection member 5 is closed by the packing 11. The disk-shaped member 62 is configured such that the rear side thereof is connected to the front side of the tubular member 61, and has an insertion hole 62a through which the first inner cable 2 is inserted at a disk center. A size of the insertion hole 62a is smaller than an outer diameter of the outer casing 21, and the rear side of the disk-shaped member 62 functions as a stopper at the time of inserting and fixing the outer casing 21 into and to the tubular member 61. The disk-shaped member 62 is housed inside the protection member 5.

The first sliding portion 63 and the second sliding portion 64 are configured so as to extend in the front-rear direction while being spaced apart from each other at a predetermined interval in the left-right direction. The first sliding portion 63 and the second sliding portion 64 are housed inside the protection member 5. In the present embodiment, the first sliding portion 63 and the second sliding portion 64 have the same shape as illustrated in FIG. 2(c). A cross-sectional shape orthogonal to the longitudinal direction thereof is a substantially trapezoidal shape surrounded by an arc forming a part of an outer circumferential circle of the disk-shaped member 62 and two parallel lines intersecting the arc at two points, respectively. The first sliding portion 63 and the second sliding portion 64 are spaced apart from each other with a central axis of the disk-shaped member 62 interposed therebetween, and are erected from the discoid member 62 in a direction along the central axis with axisymmetric arrangement with respect to the central axis. The arc portion of the cross-sectional outline of the first sliding portion 63 and the second sliding portion 64 in the auxiliary member 6 overlaps the outer circumferential circle of the disk-shaped member 62 when viewed from the axial direction.

In the auxiliary member 6, the first sliding portion 63 has a first planar portion 6a, and the second sliding portion 64 has a second planar portion 6b which opposes the first planar portion 6a and is provided with a space allowing the coupling portion 4 to be interposed between the first planar portion 6a and the second planar portion 6b. That is, as the coupling structure 1 is provided with the auxiliary member 6, it is possible to make two right and left side surfaces, parallel to each other, of the coupling portion 4 oppose the respective surfaces of the first planar portion 6a and the second planar portion 6b. As a result, even if a force is applied such that the coupling portion 4 rotates about the front-rear direction when the operating portion 91 is operated, the side surfaces of the coupling portion 4 abut on the two planar portions 6a and 6b. That is, the two planar portions 6a and 6b function as stoppers that prevent the coupling portion 4 from rotating. As a result, the coupling portion 4 can move in the front-rear direction without rotating. Here, the axial direction is a direction of a central axis of the protection member 5, and is a direction substantially coinciding with a central axis of the first and second inner cables 2 and 3 inside the protection member 5.

In the auxiliary member 6, the first sliding portion 63 has a first planar portion 6a, and the second sliding portion 64 has a second planar portion 6b which opposes the first planar portion 6a and is provided with a space allowing the coupling portion 4 to be interposed between the first planar portion 6a and the second planar portion 6b. That is, as the coupling structure 1 is provided with the auxiliary member 6, it is possible to make two right and left side surfaces, parallel to each other, of the coupling portion 4 oppose the respective surfaces of the first planar portion 6a and the second planar portion 6b. As a result, even if a force is applied such that the coupling portion 4 rotates about the front-rear direction when the operating portion 91 is operated, the side surfaces of the coupling portion 4 abut on the two planar portions 6a and 6b. That is, the two planar portions 6a and 6b function as stoppers that prevent the coupling portion 4 from rotating. As a result, the coupling portion 4 can move in the front-rear direction without rotating. Here, the axial direction is a direction of a central axis of the protection member 5, and is a direction substantially coinciding with a central axis of the first and second inner cables 2 and 3 inside the protection member 5.

The fixing member 7 is provided to fix the coupling structure 1 to a mounting object to which the coupling structure 1 is mounted. The fixing member 7 is fixed to the mounting bracket B by using a fixing plate member 74. In the present embodiment, the fixing member 7 includes the inner tubular member 71 housed in the protection member 5, the body member 72 connected to the front side of the inner tubular member 71, an outer tubular member 73 connected to the front side of the body member 72, and the fixing plate member 74 extending from the body member 72 in two mutually opposite directions orthogonal to the axis thereof.

The inner tubular member 71 has the concave portion 7a that is formed to allow the entry of the body portion 42c of the engaged portion 42. The trunk portion 42c enters the concave portion 7a until abutting on a bottom surface 7d of the concave portion 7a. An O-ring groove containing the packing 12 and a recess portion containing the engagement spring member 13 are provided around an outer circumferential surface of the inner tubular member 71. The body member 72 has the insertion hole 7b passing through the central axis, and the second inner cable 3 is inserted through the insertion hole 7b. The outer tubular member 73 has an opening 7c on the front side, and one end side of the outer casing 31 is inserted into the opening 7c and is fixed to the opening 7c by, for example, swaging.

The packing 12 and the engagement spring member 13 can be mounted to the fixing member 7 at any time before the control cables 9a and 9b are coupled by the coupling portion 4. The packing 12 is generally a well-known O-ring and is fitted to the rear side of an outer circumferential surface of the inner tubular member 71. The engagement spring member 13 has an annular-shaped ring piece 13c, three positioning pieces 13a, and three spring pieces 13b. The positioning piece 13a and the spring piece 13b are erected from the front side of the ring piece 13c, and the positioning piece 13a and the spring piece 13b are alternately arranged in the radial direction of the ring piece 13c. The positioning piece 13a is erected so as to be substantially parallel to the axial direction, and the spring piece 13b is erected to be inclined such that the front side thereof protrudes in radial direction more than the rear side thereof. The positioning piece 13a is fitted to a groove portion provided on an outer circumferential surface on the rear side of the body member 72, and thus the rotation of the engagement spring member 13 about the axial direction is restricted. As the spring piece 13b enters and is engaged with the engagement opening 5c of the protection member 5, the movement of the protection member 5 in the rear direction is restricted, and the protection member 5 is prevented from being detached from the fixing member 7.

Next, the engaging portion 41 of the coupling portion 4 and the inclined surface 4a thereof will be described. The engaging portion 41 has a shape in which an upper surface of a rectangular parallelepiped is inclined with respect to a lower surface as illustrated in the perspective view of FIG. 3. Right and left side surfaces 4b are parallel to the respective surfaces of the first planar portion 6a and the second planar portion 6b of the auxiliary member 6. The inclined surface 4a is inclined to so as to cross an axis in an extending direction of the first inner cable 2 in a joining portion between the engaging portion 41 and the first inner cable 2 and to be close to the axis in the extending direction of the first inner cable 2 from the leading end side of the engaging portion 41 toward the coupling side with the first inner cable 2. The inclined surface 4a is the upper surface of the engaging portion 41 and has a shape in which a curve R appearing on the top of an outer shape of a cross section S, perpendicular to the axial direction (front-rear direction) of the engaging portion 41, becomes an arc. A curvature radius of the arc is, for example, a radius of an inner circumferential circle of the protection member 5 (see FIG. 2(c)). The inclined surface 4a is rounded in a direction about the axis of the first inner cable 2 and is capable of slidably contacting an inner surface of the protection member 5.

Figure 3:
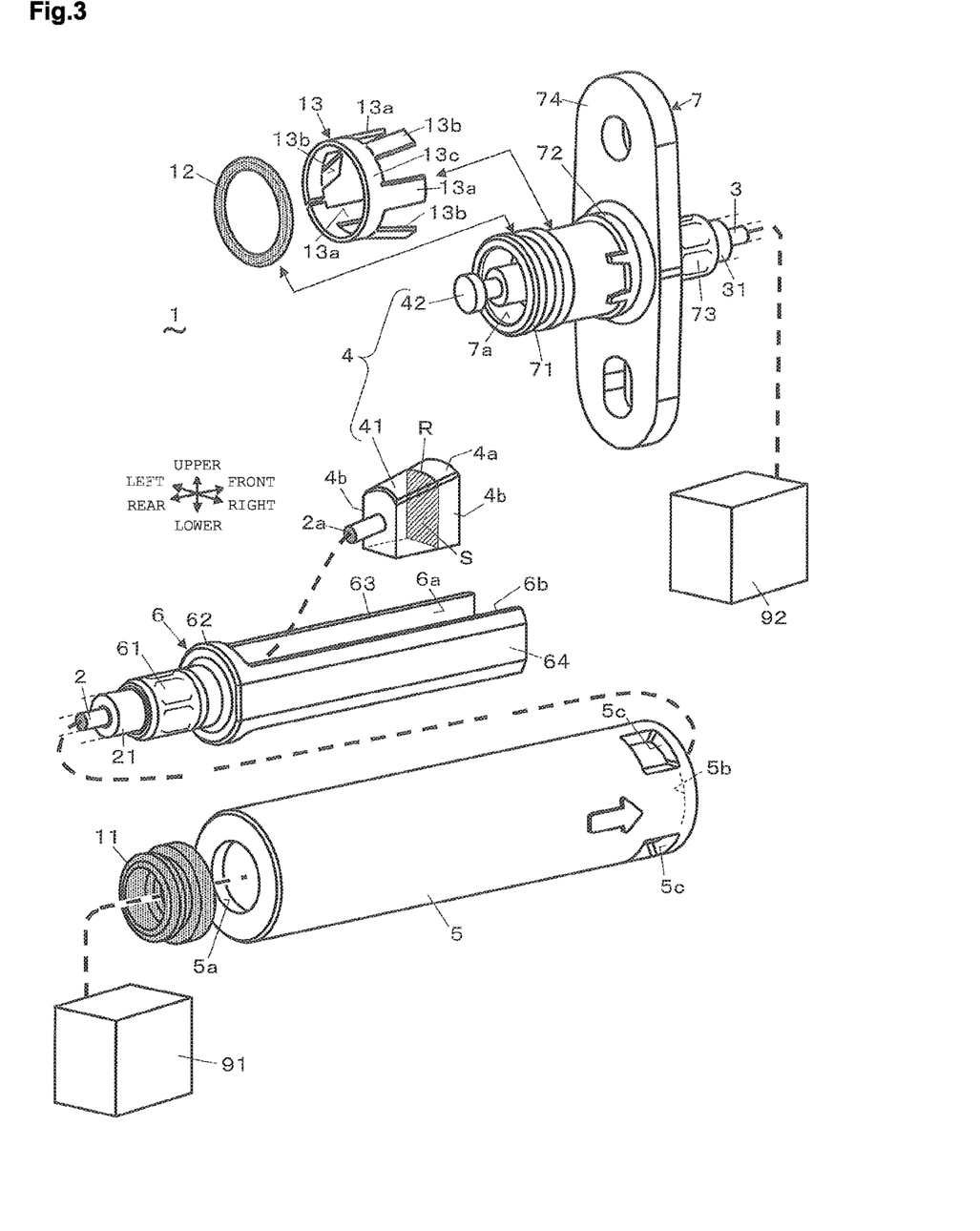
FIG. 3 is an exploded perspective view of the coupling structure according to the first embodiment.

The inclined surface 4a is a curved surface formed by parallel movement of the curve R along a straight line inclined with respect to the front rear direction. Therefore, the outline on the top side of the cross section at an optional position in the axial direction is the curve R. The inclined surface 4a is inclined from the second inner cable 3 side toward the first inner cable 2 side and is an inclined surface having an upward slope when the inclined surface 4a is viewed from the first inner cable 2 side.

Figure 4:
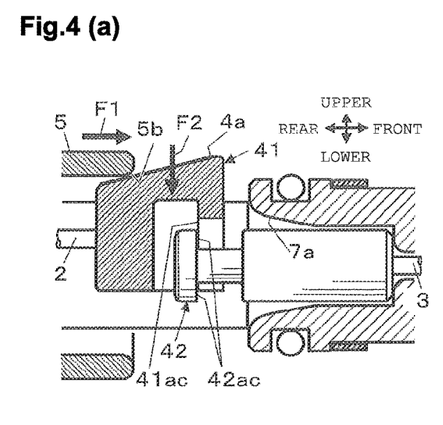

Hereinafter, an overview of a method of forming the coupling structure 1 of the present embodiment will be described. As illustrated in FIG. 4(a), the coupling using the coupling portion 4 is performed by moving the protection portion 5 forward and housing the coupling portion 4 inside the protection member 5 after forming the coupling portion 4 by engaging the engaging the engaging portion 41 from the upper side to the engaged portion 42. In general, a tensile force is applied to each of the first and second inner cables 2 and 3 at least at the time of forming the coupling portion 4. In the present embodiment, the tensile force is applied to each of the first and second inner cables 2 and 3 even before forming the coupling portion 4. Therefore, the engaged portion 42 on the second inner cable 3 side is drawn and fixed inside the concave portion 7a by the tensile force. Then, at the time of forming the coupling portion 4, a worker needs to move the engaging portion 41 on the first inner cable 2 side toward the engaged portion 42 against the tensile force to be engaged with the engaged portion 42. The worker sometimes needs to perform such work only manually without visually confirming the engagement state.

Thus, there may sometimes occur a case where the work of engaging the engaging portion 41 with the engaged portion 42 is incomplete (the state illustrated in FIG. 4(a)), and the engaging portion 41 protrudes upward from the original position in this state. In this manner, the inclined surface 4a abuts on the second opening portion 5b and guides the engaging portion 41 inside the protection member 5 in a state where the engaging portion 41 of the coupling portion 4 is positioned on the outer side in the radial direction of the opening of the second opening portion 5b when the coupling portion 4 is relatively moved with respect to and housed into the protection member 5 in the coupling structure 1 of the present embodiment.

That is, an acting direction of a forward force F1 when the worker moves the protection member 5 to the front is changed as the second opening portion 5b abuts on the inclined surface 4a, and a downward force F2 pushing the engaging portion 41 to the lower side is obtained. Thus, as illustrated in FIG. 4(b), the engaging portion 41 is guided to the regular position at the lower side due to the movement of the protection member 5 in the horizontal direction and the presence of the inclined surface 4a. Regarding such guidance, the slidability becomes good since the shape according to the curve R of the inclined surface 4a has the shape conforming to the sectional shape in the radial direction of an inner cavity of the protection member 5 so that the engaging portion 41 is easily guided to the inner cavity of the protection member 5.

Figure 5:
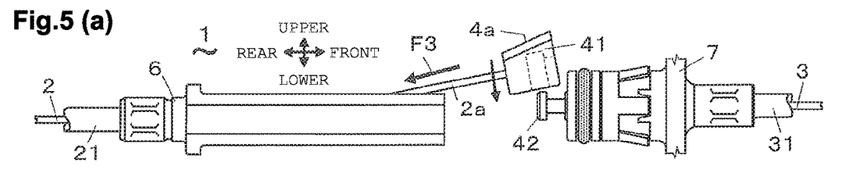

Hereinafter, the point where the engaging portion 41 is guided to the lower side due to the presence of the inclined surface 4a will be described in detail. As illustrated in FIG. 5(a), a series of coupling work using the coupling structure of the first embodiment is performed by first moving the engaging portion 41 to a position of the engaged portion 42 against a tensile force F3 and moving the engaging portion 41 to the lower side to be engaged with the engaged portion 42. At this time, it is possible to perform the work by holding the auxiliary member 6 in the hand together with the engaging portion 41. As illustrated in FIG. 5(b), after the head portion 41 and the engaged portion 42 have been engaged with each other, the engagement between the engaging portion 41 and the engaged portion 42 is maintained by the tensile force. That is, the engaging-portion-side abutment surface 41ac and the engaged-portion-side abutment surface 42ac are pressed to each other in this state. As illustrated in FIG. 5(c), however, the neck portion 42a is not sufficiently close to a bottom surface of the rear concave portion 41ab. Thus, the engaging portion 41 is positioned on the radially outer side (upper side) of the opening of the second opening portion 5b, and the inclined surface 4a and an end surface of the protection member 5 oppose each other in this state. That is, the engagement between the engaging portion 41 and the engaged portion 42 is incomplete, and the engaging portion 41 protrudes upward in this state.

When the protection member 5 is moved to the front in such a state, the inclined surface 4a and the end surface of the protection member 5 abut on each other as illustrated in FIG. 5(d). Then, when the movement of the protection member 5 in the right direction of the drawing progresses, the acting direction of the forward force F1 is changed by the inclined surface 4a, and the force F2 that pushes the engaging portion 41 to the lower side is obtained as described above. At this time, the tensile force is applied to each of the first and second inner cables 2 and 3 even if the engagement between the engaging portion 41 and the engaged portion 42 is incomplete. In addition, the engaged portion 42 is housed in the concave portion 7a. Thus, the engaged portion 42 is restricted from moving in the vertical direction. As a result, the engaging portion 41 is guided to the regular position at the lower side since the force F2 acts as a force that pushes the engaging portion 41 to the lower side with respect to the engaged portion 42. Finally, the protection member 5 is advanced to a final position to engage the protection member 5 with the engagement spring member 13, thereby forming a state where the movement of the protection member 5 in axial direction is restricted as illustrated in FIG. 5(e). In such a state, the coupling portion 4, formed by the engaging portion 41 and the engaged portion 42, is housed inside the protection member 5, thereby forming the coupling structure 1 in a coupling state. Incidentally, the state where the coupling portion 4 is positioned on the radially outer side of the second opening portion 5b indicates a state where the coupling portion 4 is positioned at a position where the second opening portion 5b and the inclined surface 4a oppose each other when the coupling portion 4 is housed in the protection member 5. As a result, when the coupling portion 4 is relatively moved with respect to and housed into the protection member 5, the coupling portion 4 abuts on the second opening portion 5b, and thus it is possible to guide the coupling portion 4 inside the protection member. Accordingly, this state includes not only the case where the engagement between the engaging portion 41 and the engaged portion 42 is incomplete as described above but also a case where a cable is bent and projects upward due to a tensile force of the cable or a routing direction regardless of whether the engagement between the engaging portion 41 and the engaged portion 42 is complete or incomplete. In this case, the coupling portion 4 is pushed down due to the force F2 against tensile forces applied by both the inner cables 2 and 3.

According to the coupling structure 1 of the present embodiment, when the coupling portion 4 is relatively moved with respect to and housed into the protection member 5, the second opening portion 5b abuts on the engaging portion 41 and guides the engaging portion 41 to the regular position at the time of moving the protection member 5 even if the engaging portion 41 is positioned in the radial direction of the protection member 5. Thus, since it is unnecessary to confirm or adjust the engagement state, so that the coupling workability is good. In addition, since a curved surface shape of the inclined surface 4a is formed to conform to an inner circumferential shape of the protection member 5, the coupling portion 4 is easily guided to the inner cavity of the protection member 5 with good stability.

<Second Embodiment>

Figure 6:
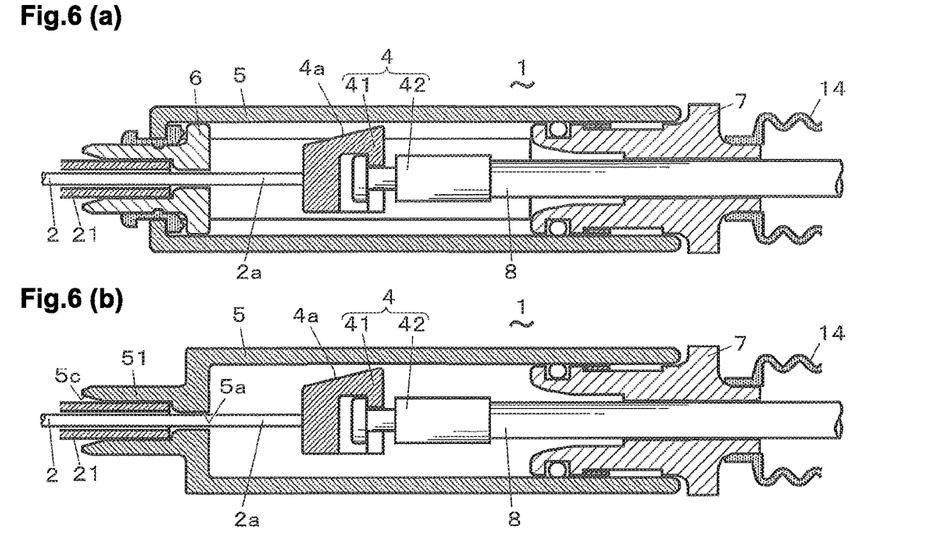

As illustrated in FIG. 6(a), the coupling structure 1 of a second embodiment couples the end portion 2a of the first inner cable 2 to a rod member 8 instead of the control cable 9b in the first embodiment. The rod member 8 is supported by the fixing member 7 to be movable forward and rearward, and is sealed by a sealing member 14. An end portion of the rod member 8 introduced into the protection member 5 has the same configuration as the engaged portion 42 in the first embodiment. A tensile force is applied to the rod member 8 similarly to the above-described second inner cable 3.

In addition, a modified example illustrated in FIG. 6(b) does not include the auxiliary member 6 in the coupling structure 1 of the second embodiment. In this modified example, the protection member 5 is fixed to one end side of the outer casing 21 (the end portion 2a side of the first inner cable 2).

In both the configurations of the coupling structure 1 of the second embodiment and the modified example thereof, the engaging portion 41 is provided with the inclined surface 4a, similar to the inclined surface 4a in the first embodiment, and the coupling workability is good even if the engaging portion 41 projects in the radial direction of the protection member 5.

<Third Embodiment>

Figure 7:
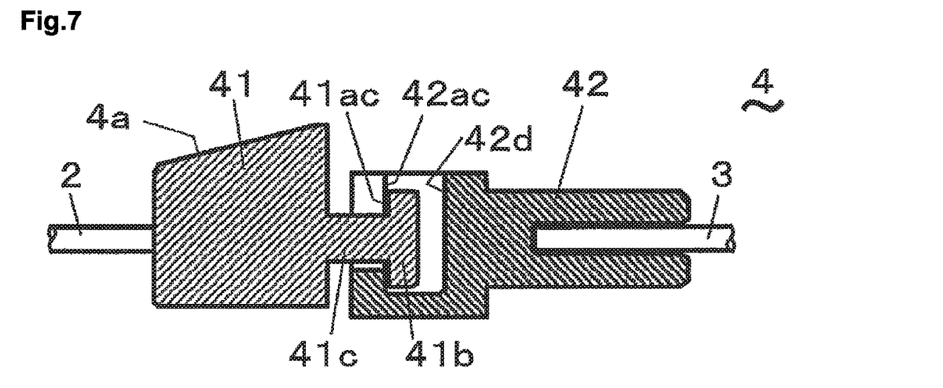
FIG. 7 is a cross-sectional view of a coupling portion of a coupling structure according to a third embodiment.

As illustrated in FIG. 7, the coupling portion 4 can be configured such that the engaging portion 41 has a head portion 41b and a neck portion 41c, the engaged portion 42 has a concave portion 42d that opens upward, and the head portion 41b serving as an engagement piece is engaged with the concave portion 42d.

<Fourth Embodiment>

Figure 8:
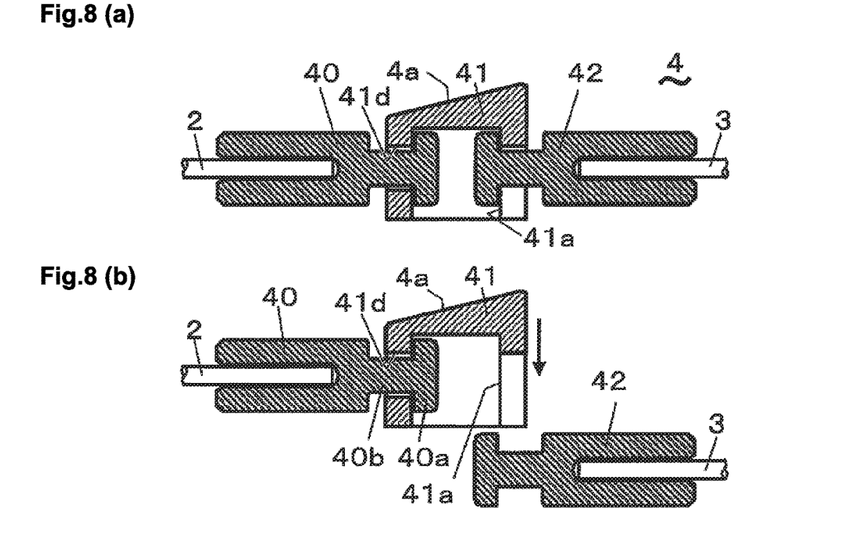

As illustrated in FIG. 8(a), the engaging portion 41 can be formed as a single joint piece which is not fixed to the first inner cable 2, and an engaged portion 40 having the same configuration as the engaged portion 42 on the second inner cable 3 side in the first embodiment can be provided at an end portion of the first inner cable 2. The engaged portion 40 has a head portion 40a and a neck portion 40b. The engaging portion 41 has concave portion 41a where the head portion 42a of the engaged portion 42 and the head portion 40a serving as an engagement piece of the engaged portion 40 are engaged with each other. A notch 41d, formed from the side communicating with the concave portion 41a, is provided in the concave portion 41a.

The head portion 40a of the engaged portion 40 is engaged with the engaging portion 41 from the side using the notch 41d. The engaged portion 40 is engaged with the engaging portion 41 from the side, and thus, is in the state of being temporarily fixed to the engaging portion 41 with respect to the vertical movement. Thus, it is possible to perform coupling work for engaging the engaging portion 41 with the engaged portion 42 in the state where the engaged portion 40 is temporarily fixed to the engaging portion 41 as illustrated in FIG. 8(b).

<Fifth Embodiment>

Figure 9:
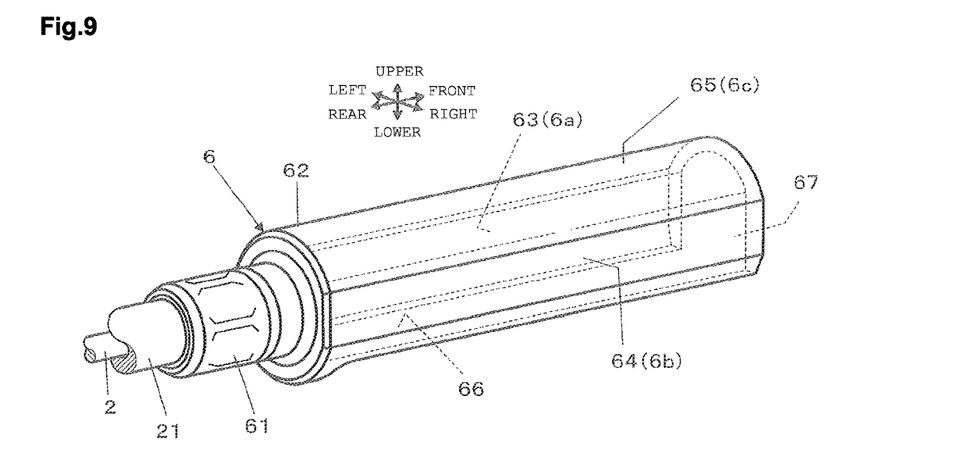
FIG. 9 is a perspective view of an auxiliary member included in a coupling structure according to a fifth embodiment.
Figure 10:
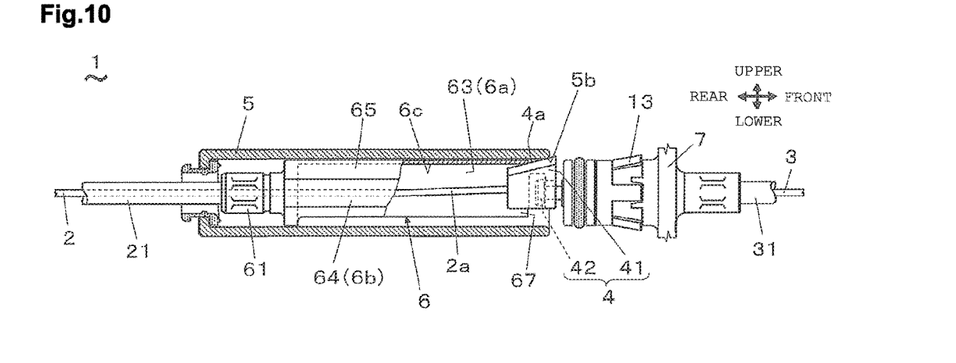
FIG. 10 is a view illustrating a state where a coupling portion is guided inside a protection member when a part of the coupling portion abuts on a movement restricting portion in the case where the auxiliary member included in the coupling structure according to the fifth embodiment is positioned on a radially outer side of a second opening portion.
Figure 11:
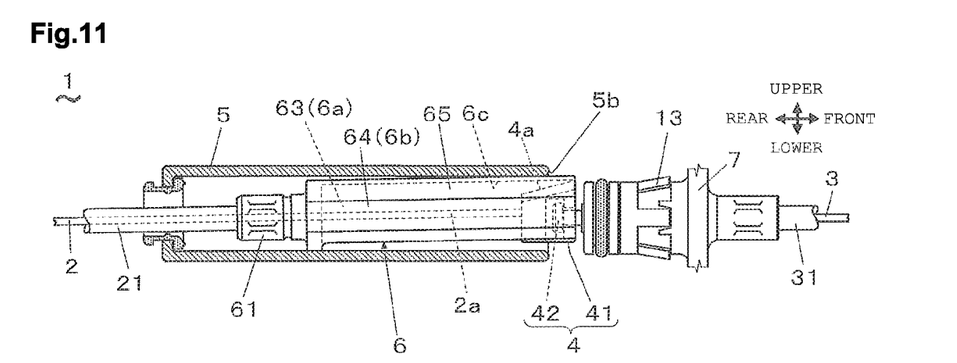
FIG. 11 is a view illustrating a state where the coupling portion is guided inside the protection member in the case where the auxiliary member included in the coupling structure according to the fifth embodiment is positioned on the radially outer side of the second opening portion.

As illustrated in FIGS. 9 to 11, the auxiliary member 6 may have a movement restricting portion 65 that restricts the engaging portion 41, arranged between the first sliding portion 63 and the second sliding portion 64 from being removed from a portion between the first sliding portion 63 and the second sliding portion 64. The movement restricting portion 65 is provided at one end portion of at least one of the first sliding portion 63 and the second sliding portion 64 in a direction perpendicular to a direction in which the first cable 2 extends from a coupling portion that couples the first sliding portion 63 and the second sliding portion 64, and has a length in the extending direction of the first cable 2. The auxiliary member 6 has a lower opening portion 66 that partially opens in the direction perpendicular to the extending direction of the first cable 2 by providing the first sliding portion 63, the second sliding portion 64, and the movement restricting portion 65. The auxiliary member 6 forms an internal space where the engaging portion 41 is movable in the extending direction of the first cable 2. The movement restricting portion 65 faces the internal space configured of the first sliding portion 63, the second sliding portion 64, and the movement restricting portion 65, and is provided with an abutment portion 6c abutting on the engaging portion 41. The movement restricting portion 65 is housed inside the protection member 5 similarly to the first sliding portion 63 and the second sliding portion 64. Thus, the movement restricting portion 65 has an outer surface opposing an inner wall of the protection member 5. An extension length and an arrangement position of the movement restricting portion 65 are not limited as long as the movement restricting portion 65 is provided to abut on the engaging portion 41 at the time of engaging the engaging portion 41 with the engaged portion 42 to be capable of preventing the deviation of the engaging portion 41 from the portion between the first sliding portion 63 and the second sliding portion 64. As the movement restricting portion 65 abuts on the engaging portion 41 at the time of engaging the engaging portion 41 with the engaged portion 42, the engaging portion 41 is prevented from deviating from the position between the first sliding portion 63 and the second sliding portion 64. Thus, the coupling work of engaging the engaging portion 41 and the engaged portion 42 is facilitated. In addition, the rigidity of the auxiliary member 6 can also be increased by the rigidity of the movement restricting portion 65. The movement restricting portion 65 can prevent the first sliding portion 63 and the second sliding portion 64 from moving from a predetermined position by an external force or the like. The extending direction of the first sliding portion 63 and the second sliding portion 64 is substantially the same as the axial direction of the protection member 5, and is also substantially the same as the moving direction of the coupling portion 4 inside the protection member 5.

In the present embodiment, the movement restricting portion 65 connects one end of the first sliding portion 63 and one end of the second sliding portion 64 in the direction perpendicular to the extending direction of the first cable 2, and is provided as an upper wall portion of the auxiliary member 6. The movement restricting portion 65 may be provided as a long plate-shaped member that is erected in a direction along the central axis of the auxiliary member 6 from the disk-shaped member 62, extends in the front-rear direction to a leading end of the auxiliary member 6 with the same length as the first sliding portion 63 and the second sliding portion 64, and connects upper sides of the first sliding portion 63 and the second sliding portion 64. In the present embodiment, the distal end of the auxiliary member 6 includes a leading end of the first sliding portion 63, a leading end of the second sliding portion 64, and a leading end of the movement restricting portion 65. A cross-sectional shape of the movement restricting portion 65 orthogonal to the longitudinal direction is a shape whose outline shape conforms to the inner surface of the protection member 5, and the shape on the coupling portion 4 side can be formed in a shape conforming to an opposing surface of the coupling portion 4. When the movement restricting portion 65 moves in the direction perpendicular to a direction extending in the longitudinal direction of the movement restricting portion 65, the first sliding portion 63, the second sliding portion 64, and the movement restricting portion 65 abut on the inner surface of the protection member 5, and thus the movement restricting portion 65 is prevented from rattling. An outer surface of the movement restricting portion 65 and the inner surface of the protection member 5 are made slidable and have an interval in which the rattling is prevented. In the present embodiment, the movement restricting portion 65 has a shape in which the protection member 5 side, which is the upper side, conforms to an arc forming a part of the inner circumferential circle of the protection member 5, and the coupling portion 4 (engaging portion 41) side, which is the lower side, conforms to the shape of the inclined surface 4a. Further, in the present embodiment, the shape of the above-described part of the inner circumferential circle of the protection member 5, the shape of the movement restricting portion 65 on the inner surface side of the protection member 5, the shape of the movement restricting portion 65 on the engaging portion 41 side, the shape of the inclined surface 4a in the cross section perpendicular to the axial direction of the coupling portion 4 are similar to each other. In the present embodiment, the movement restricting portion 65 on the inner surface side of the protection member 5 is in contact with the inner circumferential surface of the protection member 5 in the auxiliary member 6 housed in the protection member 5. Incidentally, when the engaging portion 41 and the engaged portion 42 are not completely engaged with each other and the engaging portion 41 is caught by the engaged portion 42 at the time of coupling the engaging portion 41 and the engaged portion 42, the upper surface of the engaging portion 41 becomes an inclined surface with respect to the extending direction of the first cable 2. The abutment portion 6c of the movement restricting portion 65 may abut on the inclined surface that is provided as the inclined surface of the engaging portion 41, or may abut on the inclined surface of the engaging portion 41 that is inclined due to failure in engagement between the engaging portion 41 and the engaged portion 42.

The abutment portion 6c opposes the direction orthogonal to the direction along the central axis of the auxiliary member 6, and connects the first planar portion 6a and the second planar portion 6b at one end side in the direction orthogonal to the direction along the central axis of the auxiliary member 6. In the present embodiment, the side that opposes the engaging portion 41 which is the lower side of the movement restricting portion 65 is the abutment portion 6c. In addition, the auxiliary member 6 according to the present embodiment includes the lower opening portion 66, a leading end opening portion 67 provided at the leading end of the auxiliary member 6, and the internal space. The lower opening portion 66 is provided on the side that opposes the movement restricting portion 65 with the axial direction of the auxiliary member 6 interposed therebetween and extending along the central axis of the auxiliary member 6. The internal space is surrounded by the disk-like member 62, the first sliding portion 63, the second sliding portion 64, the movement restricting portion 65, the lower opening portion 66, and the leading end opening portion 67. The lower opening portion 66 serves as an entrance for housing the engaging portion 41 in the internal space of the auxiliary member 6 as will be described later. The internal space of the auxiliary member 6 houses at least a part of the coupling portion 4 that has been introduced from the lower opening portion 66. After the auxiliary member 6 is housed in the protection member 5, the internal space of the auxiliary member 6 becomes a part of the internal space of the protection member 5. That is, it can be said that the coupling portion 4 moves in the direction along the axis (the front-rear direction) inside the internal space of the auxiliary member 6 by the operation of the operating portion in the present embodiment. Incidentally, the coupling portion 4 may move in contact with the abutment portion 6c or does not necessarily move contact therewith. The leading end opening portion 67 is an opening provided at the leading end of the auxiliary member 6, and is configured of a leading end of the first sliding portion 63, a leading end of the second sliding portion 64, a leading end of the movement restricting portion 65, and a leading end of the lower opening portion 66 in the present embodiment.

As in the present embodiment, when the coupling structure includes the auxiliary member 6 having the movement restricting portion 65, it is possible to form the coupling portion 4 by gripping only the auxiliary member 6 to engage the engaging portion 41 with the engaged portion 42. For example, first, the engaging portion 41 is introduced from the lower opening portion 66 into the internal space of the auxiliary member 6. At this time, since the movement restricting portion 65 is provided, it is possible to restrict the engaging portion 41 from moving completely beyond the one end side in the direction orthogonal to the extending direction of the first sliding portion 63 and the second sliding portion 64. In addition, the removal of the auxiliary member 6 from the internal space can be restricted when the engaging portion 41 moves from the internal space of the auxiliary member 6 in a direction other than an opening direction of the lower opening portion 66 and an opening direction of the leading end opening portion 67. Incidentally, the rear concave portion 41ab of the engaging portion 41 opens in the same direction as the lower opening portion 66.

Next, the engaging portion 41 is brought closer together with the auxiliary member 6 from above the engaged portion 42 to engage the engaging portion 41 with the engaged portion 42, and the engaging portion 41 and the engaged portion 42 are engaged with each other. At this time, for example, when the engaging portion 41 and the engaged portion 42 are engaged with each other such that the lower opening portion 66 does not face downward, it is possible to maintain the state where the engaging portion 41 is arranged in the internal space of the auxiliary member 6. That is, when the engaging portion 41 and the engaged portion 42 are engaged with each other, it is possible to engaged the engaging portion 41 with the auxiliary member 6 by gripping the auxiliary member 6. Thus, the workability at the time of engaging the engaging portion 41 and the engaged portion 42 is good since it is unnecessary to perform the engaging work by gripping each of the engaging portion 41 and the auxiliary member 6.

In addition, when the auxiliary member 6 does not include the movement restricting portion 65 as in the first embodiment, there is a case where the side (lower side) of the engaging portion 41 opposite to the inclined surface 4a transcends the one end side (the upper side in FIG. 5(c)) in the direction orthogonal to the extending direction of the first sliding portion 63 and the second sliding portion 64 during the coupling work. In this case, the inclined surface 4a does not abut on the second opening portion 5b of the protection member 5 in the middle of advancing the protection member 5 to the final position, and thus, the coupling portion 4 cannot be housed inside the protection member On the other hand, in the auxiliary member 6 according to the present embodiment, it is possible to restrict the first sliding portion 63 and the second sliding portion 64 from moving completely beyond the one end side in the direction orthogonal to the extending direction of the first sliding portion 63 and the second sliding portion 64 by the movement restricting portion 65 as described above. That is, when the auxiliary member 6 is moved in the direction to engage the engaging portion 41 and the engaged portion 42 at the time of performing the engaging work, the movement restricting portion 65 functions as a stopper that is provided in the direction opposite to the direction to engage the engaging portion 41 and the engaged portion 42. Thus, the axis of the auxiliary member 6 does not deviate largely from the axis of the protection member 5.

For example, there is a case where a part of the engaging portion 41 transcends the abutment portion 66 and protrudes from the leading end opening portion 67 when the protection member 5 is advanced to the final position where the protection member 5 can be engaged with the engagement spring member 13 as illustrated in FIG. 10. More specifically, there is a case where a state where the inclined surface 4a protrudes from the leading end opening portion 67 in the axial direction is formed. Even in such a case, if at least a part of the upper side of the engaging portion 41 abuts on the abutment portion 6c, the side of the engaging portion 41 opposite to the inclined surface 4a does not completely transcend the one end side in the direction orthogonal to the extending direction of the first sliding portion 63 and the second sliding portion 64. That is, since the inclined surface 4a can be set to oppose the second opening portion 5b of the protection member 5, the inclined surface 4a abuts on the second opening portion 5b in the middle of advancing the protection member 5 to the final position, and thus, the engaging portion 41 can be relatively moved with respect to the protection member 5 and housed inside the protection member 5. In addition, since the auxiliary member 6 does not deviate largely from the axis of the protection member 5, the protection member 5 is hardly caught by the auxiliary member 6 when being advanced, and the auxiliary member 6 hardly hinders the advancement of the protection member 5.

In addition, even when the entire engaging portion 41 is positioned in the internal space of the auxiliary member 6 as illustrated in FIG. 11, there is a case where the leading end side of the auxiliary member 6 protrudes from the second opening portion 5b and the auxiliary member 6 is inclined with respect to the axial direction of the protection member 5 so that the leading end side of the auxiliary member 6 opposes the second opening portion 5b in the axial direction depending on the size and shape in radial direction of the auxiliary member 6 with respect to an inner diameter of the protection member 5. That is, there is a case where the auxiliary member 6 is inclined with respect to the axial direction of the protection member 5 because the movement of the engaging portion 41 toward the engaged portion 42 side is insufficient and the engagement between the engaging portion 41 and the engaged portion 42 is insufficient. Even in such a case, the movement restricting portion 65 positioned on the radially outer side of the second opening portion 5b abuts on the second opening portion 5b when the protection member 5 is moved forward. As the forward movement of the protection member 5 is continued, the movement restricting portion 65 is pushed toward the engaged portion 42 side (downward in the drawing) by the second opening portion 5b. Since the abutment portion 6c of the movement restricting portion 65 abuts on the inclined surface 4a side of the engaging portion 41, the engaging portion 41 moves downward in the drawing by the forward movement of the protection member 5, and the state where the engagement with the engaged portion 42 is insufficient is eliminated.

The movement restricting portion 65 included in the auxiliary member 6 according to the present embodiment has been described above. However, the movement restricting portion 65 may be provided to connect each part of the first sliding portion 63 and the second sliding, portion 64 as long as the movement restricting portion 65 is provided so as to correspond to the position of the engaging portion 41 when the engaging portion 41 is engaged with the engaged portion 42. In particular, the position of the engaging portion 41 when the engaging portion 41 is engaged with the engaged portion 42 is set to the leading end side of the auxiliary member 6 to be provided at least beyond an axial length of the engaging portion 41 from the distal end of the auxiliary member 6, it is easy to make the movement restricting portion 65 and the engaging portion 41 abut on each other during the engaging work.

A shape of the first abutment portion 6c of the movement restricting portion 65 on a side that abuts on the engaging portion 41 is not particularly limited as long as a shape that allows the abutment on the engaging portion 41 is formed. The shape can be formed in a shape including a shape conforming to an outer shape of an abutment side of the engaging portion 41. This is because it is easy to make the movement restricting portion 65 and the engaging portion 41 abut on each other. Similarly, when a shape of the movement restricting portion 65 on a side opposing the protection member 5 is also formed in a shape conforming to the inner circumferential surface of the protection member 5, it is easy to make the movement restricting portion 65 and the second opening portion 5b of the protection member 5 abut on each other. In addition, a shape of the engaging portion 41 on a side that abuts on the second opening portion 5b may be formed in a shape whose cross-sectional shape in the direction perpendicular to the axial direction of the coupling portion is the uniform shape that is the same at any area instead of being formed as the inclined surface. In such a case, the inclined surface of the engaging portion may be formed as a surface inclined with respect to the axial direction of the coupling portion in an insufficient engagement state before the engaging portion is completely engaged with the engaged portion to form the coupling portion. That is, when the axis of the auxiliary member 6 is inclined with respect to the axis of the protection member 5 in the case illustrated in FIG. 11, the inclined surface is an outer circumferential surface of the movement restricting portion 65 that abuts on the engaging portion 41.

Incidentally, the present invention is not limited to the above-described configurations, and various modifications can be made. For example, the configurations of the respective embodiments described above can be combined with each other. The shape of the engaging portion 41 of the coupling portion 4 is not limited to the shape having the inclined surface 4a on the upper surface of the rectangular parallelepiped, and may be another shape as long as the inclined surface 4a is provided. In addition, the cross-sectional shape of the shape of the inclined surface 4a is not limited to the arc shape, and may be any inclined surface that allows the second opening portion 5b of the protection member 5 to abut thereon and guides the coupling portion 4 (the engaging portion 41) inside the protection member 5. The protection member 5 is not limited to a circular tubular member, and may be a tubular member other than the circular tubular member.

In addition, the coupling structure 1 does not necessarily couple the cables with each other. For example, the coupling structure 1 may be any structure that couples one end of a cable and other members such as the above-described rod member. In addition, the cable is not limited to the control cable, and may be one used to transmit an operating force such as a rope. Further, when the cable is the control cable, the cable may be a cable that does not include an outer casing. In addition, the terms such as the engaging portion the engaged portion are relative to each other and can be exchanged with each other.

REFERENCE SIGNS LIST 1 coupling structure
2 inner cable (first cable)
2a end portion (one end of first cable)
21 outer casing of first cable
3 inner cable (second cable)
3a end portion (one end of second cable, other member)
31 outer casing of second cable
4 coupling portion
4a inclined surface
41 engaging portion (coupling portion)
41a concave portion
41af front concave portion
41ab rear concave portion
41ac engaging-portion-side abutment surface
42 engaged portion (coupling portion)
42a head portion
42b neck portion
42c body portion
42ac engaged-portion-side abutment surface
5 protection member
5a first opening portion
5b second opening portion
6 auxiliary member
6a first planar portion 6b second planar portion
6c abutment portion
63 first sliding portion
64 second sliding portion
65 movement restricting portion
66 lower opening portion
67 leading end opening portion
8 rod member (other member)
9a control cable (with first cable)
9b control cable (with. second cable)
B mounting bracket

The invention claimed is:

1. A coupling structure that couples one end of a first cable and one end of a second cable, the coupling structure comprising:
   a coupling portion, having a first cable side and a second cable side, that couples the one end of the first cable and the one end of the second cable, and
   a protection member that slidably houses the coupling portion:
   wherein the protection member has a first opening portion which is provided at one end portion of the protection member and through which the first cable is inserted such that the first cable and the protection member are relatively movable, and a second opening portion provided at another end portion of the protection member and from which the first cable is extendable;
   the coupling portion has an inclined surface that is inclined from the second cable side toward the first cable side so as to abut on the second opening portion and guide the coupling portion inside the protection member in a state where the coupling portion is positioned on a radially outer side of the second opening portion when the coupling portion is relatively moved with respect to and housed into the protection member;
   at least one of the first cable and the second cable is an inner cable of a control cable that is comprised of the inner cable and an outer casing;
   an auxiliary member to be housed inside the protection member is fixed to one end side of the outer casing,
   the auxiliary member includes a first sliding portion which has a first planar portion and a second sliding portion which has a second planar portion opposing the first planar portion and provided with a space allowing the coupling portion to be interposed between the first planar portion and the second planar portion, and
   when the coupling portion is relatively moved with respect to and housed into the protection member, the coupling portion slides on the first sliding portion and the second sliding portion and is housed inside the protection member as the auxiliary member is housed inside the protection member.

2. The coupling structure according to claim 1, wherein the coupling portion has an engaging portion fixed to the one end of the second cable or the one end of the first cable, and an engaged portion provided on the one end of the first cable or the one end of the second cable and engaged with the engaging portion.

3. The coupling structure according to claim 1, wherein the inclined surface in a cross-section perpendicular to an axial direction of the coupling portion has a shape corresponding to a cross-sectional shape in a radial direction of an inner cavity of the protection member.

* * * * *